United States Patent
Maschmeyer

(10) Patent No.: US 9,481,833 B2
(45) Date of Patent: Nov. 1, 2016

(54) PROCESSING OF ORGANIC MATTER

(75) Inventor: Thomas Maschmeyer, Lindfield (AU)

(73) Assignee: IGNITE RESOURCES PTY LTD (AU)

( * ) Notice: Subject to any disclaimer, the term of this patent is extended or adjusted under 35 U.S.C. 154(b) by 484 days.

(21) Appl. No.: 13/978,374

(22) PCT Filed: Dec. 15, 2011

(86) PCT No.: PCT/AU2011/001624
§ 371 (c)(1),
(2), (4) Date: Jul. 3, 2013

(87) PCT Pub. No.: WO2012/092644
PCT Pub. Date: Jul. 12, 2012

(65) Prior Publication Data
US 2013/0276361 A1    Oct. 24, 2013

(30) Foreign Application Priority Data
Jan. 5, 2011 (AU) ................................ 2011900020

(51) Int. Cl.
| C07C 1/00 | (2006.01) |
| C10G 1/06 | (2006.01) |
| C10L 1/02 | (2006.01) |
| C10G 1/08 | (2006.01) |

(52) U.S. Cl.
CPC ............ *C10G 1/065* (2013.01); *C10G 1/083* (2013.01); *C10L 1/02* (2013.01); *C10G 2300/1014* (2013.01); *C10G 2300/1059* (2013.01); *C10G 2300/4006* (2013.01); *C10G 2300/4012* (2013.01); *C10G 2300/4081* (2013.01); *C10G 2300/802* (2013.01); *C10G 2300/805* (2013.01); *Y02P 30/20* (2015.11)

(58) Field of Classification Search
CPC ........ C10G 1/00; C10G 1/002; C10G 1/086; C10G 1/08; C10G 49/00; C10G 2300/10011; C10G 2300/1014; C10G 2300/44; C10L 1/02
USPC ........................................... 585/240; 44/605
See application file for complete search history.

(56) References Cited

U.S. PATENT DOCUMENTS

| 4,045,328 A | 8/1977 | Green et al. |
| 4,642,401 A | 2/1987 | Coenen et al. |

(Continued)

FOREIGN PATENT DOCUMENTS

| CN | 101765650 A | 9/2007 |
| CN | 101591527 A | 12/2007 |

(Continued)

OTHER PUBLICATIONS

EPO Application No. EP11855036.7, Supplementary European Search Report and European Search Opinion mailed Nov. 6, 2015.

(Continued)

*Primary Examiner* — Nina Bhat
(74) *Attorney, Agent, or Firm* — Alston & Bird LLP

(57) ABSTRACT

A method for biofuel production from high temperature oil-based processing of organic matter, comprising: producing a slurry from organic matter feedstock, water and oil; treating the slurry in a reactor apparatus at increased temperature and pressure; and cooling the slurry and releasing the pressure thereby providing a product comprising the biofuel.

18 Claims, 1 Drawing Sheet

(56) References Cited

U.S. PATENT DOCUMENTS

| | | | | |
|---|---|---|---|---|
| 4,793,916 A | * | 12/1988 | Aldridge | C10G 1/086 208/420 |
| 6,822,126 B2 | | 11/2004 | Miller | |
| 7,262,331 B2 | | 8/2007 | Van de Beld et al. | |
| 8,673,027 B2 | | 3/2014 | Kleinert et al. | |
| 8,945,246 B2 | | 2/2015 | Tsurutani et al. | |
| 2004/0192980 A1 | | 9/2004 | Appel et al. | |
| 2009/0064566 A1 | | 3/2009 | Brummerstedt Iversen et al. | |
| 2009/0099380 A1 | * | 4/2009 | Aiken | C11C 3/003 554/167 |
| 2010/0186291 A1 | | 7/2010 | Yie et al. | |
| 2010/0192457 A1 | * | 8/2010 | Tsurutani | C10G 1/002 44/605 |
| 2010/0312027 A1 | * | 12/2010 | Tsurutani | C10G 1/002 585/242 |
| 2011/0209387 A1 | * | 9/2011 | Humphreys | C10L 1/02 44/307 |
| 2012/0022307 A1 | * | 1/2012 | Yanik | C10G 1/002 585/240 |
| 2013/0192123 A1 | * | 8/2013 | Maschmeyer | C10G 1/083 44/307 |
| 2014/0288338 A1 | * | 9/2014 | Radlein | C10G 3/44 585/251 |

FOREIGN PATENT DOCUMENTS

| | | |
|---|---|---|
| CN | 101932670 A | 12/2010 |
| EP | 1862527 A1 | 12/2007 |
| JP | 2007241670 A | 9/2007 |
| RU | 2013116811 A | 10/2014 |
| WO | WO 2007/047063 A2 | 4/2007 |
| WO | WO 2011/123897 A1 | 10/2011 |
| WO | WO 2012/000033 A1 | 1/2012 |
| WO | WO 2012/035410 A2 | 3/2012 |
| WO | WO 2012/092644 A1 | 7/2012 |

OTHER PUBLICATIONS

WIPO Application No. PCT/AU2011/001624, PCT International Preliminary Report on Patentability issued Jul. 10, 2013.

WIPO Application No. PCT/AU2011/001624, PCT International Search Report mailed Mar. 7, 2012.

WIPO Application No. PCT/AU2011/001624, PCT Written Opinion of the International Searching Authority mailed Mar. 7, 2012.

* cited by examiner

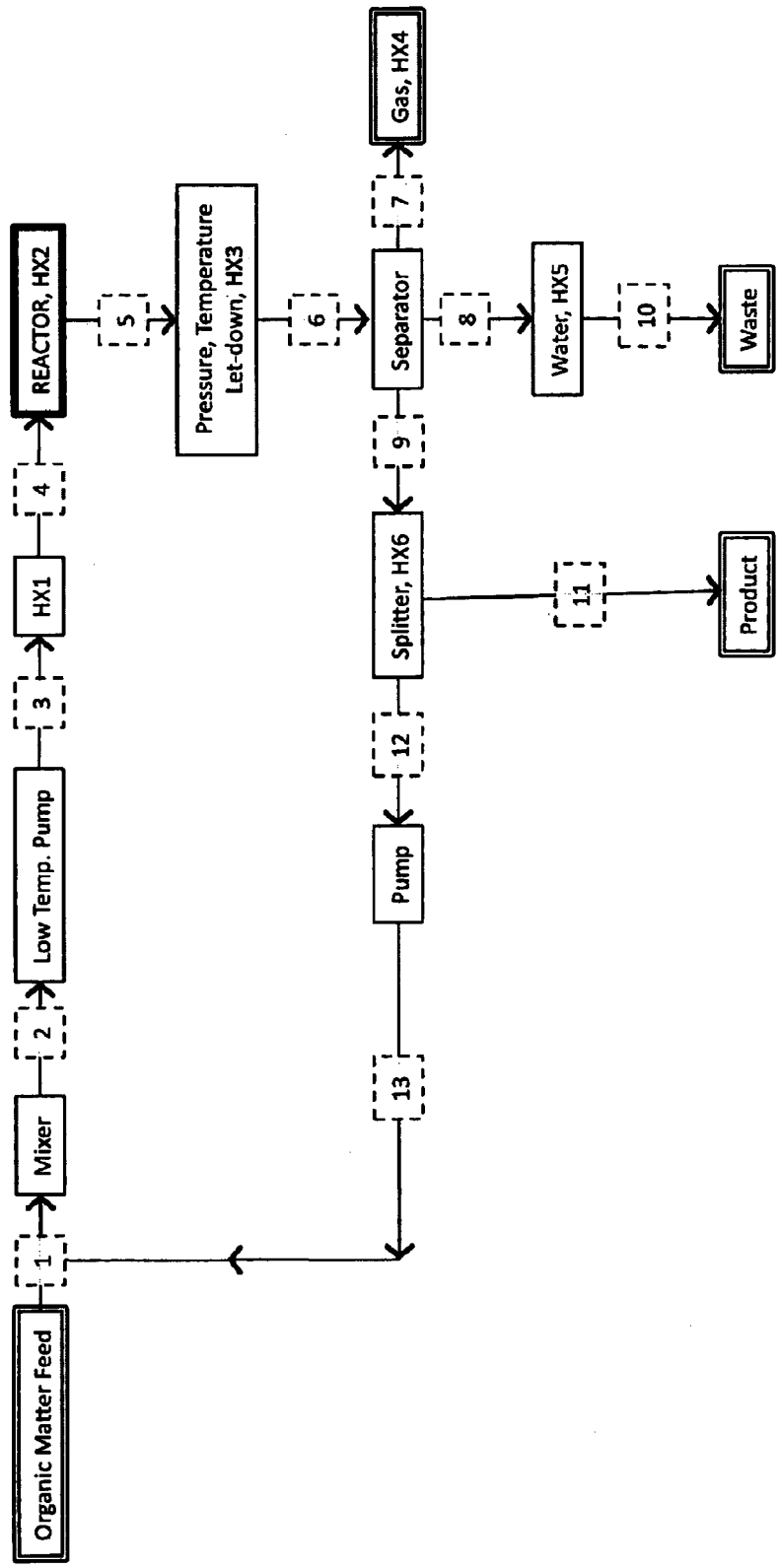

PROCESSING OF ORGANIC MATTER

INCORPORATION BY CROSS-REFERENCE

This application is the US national stage of PCT/AU2011/001624, filed Dec. 15, 2011, which claims priority from Australian provisional patent application number 2011900020 filed on 5 Jan. 2011, the contents of which are incorporated herein by cross-reference in their entirety.

TECHNICAL FIELD

The invention relates generally to the field of fuel production. More specifically, the invention relates to biofuel production from high temperature oil-based processing of organic matter.

BACKGROUND

The conversion of solid, low-energy density lignocellulosic biomass into liquid, high-energy density bio-oils that are stable, storable, pumpable and which can be co-processed in near conventional refineries to conventional refinery products (i.e. "drop-in" fuel products) is a primary goal that underpins sustainable biofuel production.

Existing approaches for so-called "first generation" biofuel production commonly use plant seeds leaving the remainder of the plant unused. Apart from being wasteful the biofuels generated by these processes are so-called oxygenates (e.g. ethanol, fatty acid methyl esters) which have a notably lower energy density than fossil diesel or gasoline.

Pyrolysis (heating biomass to very high temperatures in an atmospheric to low oxygen environment) is an alternative approach used to convert biomass into liquid bio-oils. However, liquid bio-oils produced by pyrolysis are generally of a very high oxygen content, resulting in low energy density and increased instability ('gumming up') making them difficult to process commercially. Although pyrolysis may be taken further to gasification and the gases utilised in Fischer-Tropsch diesel synthesis to process pyrolysis oils into drop-in liquid fuels, the capital costs involved in doing so are significant which has impeded wide-spread implementation thus far.

Significant progress has been made in the hydrothermal upgrading of pyrolysis oils (both with and without catalysts) to produce more stable oil products with lowered oxygen content. However, these processes still suffer from difficulties that significantly impact on upscaling/commercial operation including, for example, constraints on the proportion of feedstock in reaction slurries, sub-optimal heat transfer, and product separation.

SUMMARY OF THE INVENTION

In light of the disadvantage/s associated with current methodologies including those described above, a need exists for improved biofuel production processes.

A number of existing methods utilise aqueous solvents (e.g. water and/or aqueous alcohols) at high temperature and pressure to produce bio-oils from organic matter. It has been unexpectedly determined that the addition of oil to these solvents (e.g. combining oil and/or water and/or aqueous alcohol) provides a means of increasing the efficiency of bio-oil production.

In a first aspect the invention provides a method for producing biofuel, the method comprising:
producing a slurry comprising organic matter feedstock, water and oil;
treating the slurry in a reactor apparatus at a temperature of between about 200° C. and about 450° C. and a pressure of between about 180 bar and about 350 bar; and
cooling the slurry and releasing said pressure thereby providing a product comprising said biofuel.

In one embodiment of the first aspect, the slurry comprises between about 20% and about 60% by weight of said oil.

In one embodiment of the first aspect, the slurry comprises between about 20% and about 40% by weight of said organic matter.

In one embodiment of the first aspect, the slurry further comprises an aqueous alcohol.

In one embodiment of the first aspect, the aqueous alcohol is ethanol or methanol.

In one embodiment of the first aspect, the slurry comprises a percentage by weight of said alcohol of: between about 5 wt % and about 40 wt %, between about 5 wt % and about 30 wt %, between about 5 wt % and about 25 wt %, between about 5 wt % and about 20 wt %, between about 5 wt % and about 15 wt %, or between about 5 wt % and about 10 wt %.

In one embodiment of the first aspect, the organic matter is lignocellulosic matter.

In one embodiment of the first aspect, the organic matter is lignite.

In one embodiment of the first aspect, said treating comprises heating and pressurising the slurry in at least one vessel or chamber of said reactor apparatus.

In one embodiment of the first aspect, said treating comprises generating subcritical or supercritical steam independently of the slurry and contacting the slurry with the subcritical or supercritical steam in at least one vessel or chamber of said reactor apparatus.

In one embodiment of the first aspect, the slurry is at ambient or near ambient temperature and pressure prior to said contacting with the subcritical or supercritical steam.

In one embodiment of the first aspect, said treating comprises: heating the slurry to a temperature selected from the group consisting of at least about 100° C., at least about 150° C., at least about 200° C., at least about 250° C., at least about 300° C., at least about 350° C., between about 200° C. and about 250° C., between about 200° C. and about 400° C., between about 250° C. and about 400° C., between about 250° C. and about 350° C., and between about 250° C. and about 350° C.; generating subcritical or supercritical steam independently of the slurry; and contacting the slurry with the subcritical or supercritical steam in at least one vessel or chamber of said reactor apparatus. The slurry may be pressurised prior to and/or after said contacting.

In a second aspect the invention provides a method for producing a biofuel, the method comprising treating organic matter with an oil-based solvent comprising less than about 50 wt % water at a temperature of between about 200° C. and about 450° C., and a pressure of between about 180 bar and about 350 bar.

In a third aspect the invention provides a method for producing a biofuel, the method comprising treating organic matter with an oil-based solvent comprising less than about 50 wt % water at a temperature of between about 200° C. and about 400° C., and a pressure of between about 100 bar and about 300 bar.

In a fourth aspect the invention provides a method for producing a biofuel, the method comprising treating organic matter with an oil-based solvent comprising less than about 50 wt % water at a temperature of between about 200° C. and about 400° C., and said pressure is between about 50 bar and about 300 bar.

In one embodiment of the second, third and fourth aspects, said treating comprises heating and pressurising a slurry comprising said organic matter in at least one vessel or chamber of a reactor apparatus.

In one embodiment of the second, third and fourth aspects, said treating comprises contacting a slurry comprising said organic matter with subcritical or supercritical steam.

In one embodiment of the second, third and fourth aspects, the slurry is at ambient or near ambient temperature and pressure prior to said contacting with the subcritical or supercritical steam.

In one embodiment of the second, third and fourth aspects, said treating comprises: heating a slurry comprising said organic matter to a temperature selected from the group consisting of at least about 100° C., at least about 150° C., at least about 200° C., at least about 250° C., at least about 300° C., at least about 350° C., between about 200° C. and about 250° C., between about 200° C. and about 400° C., between about 250° C. and about 400° C., between about 250° C. and about 350° C., and between about 250° C. and about 350° C.; generating subcritical or supercritical steam independently of the slurry; and contacting the slurry with the subcritical or supercritical steam in at least one vessel or chamber of said reactor apparatus. The slurry may be pressurised prior and/or after to said contacting.

In one embodiment of the first, second, third and fourth aspects, the temperature is between about 300° C. and about 380° C., and the pressure is between about 200 bar and about 300 bar.

In one embodiment of the first, second, third and fourth aspects, the treating comprises use of at least one additional catalyst.

In one embodiment of the first, second, third and fourth aspects, the least one additional catalyst is an additional base catalyst.

In one embodiment of the first, second, third and fourth aspects, the additional base catalyst is an alkali metal hydroxide catalyst or a transition metal hydroxide catalyst.

In one embodiment of the first, second, third and fourth aspects, the additional base catalyst is sodium hydroxide or potassium hydroxide.

In one embodiment of the first, second, third and fourth aspects, the treating is performed under conditions of continuous flow.

In one embodiment of the first, second, third and fourth aspects, the treating comprises use of at least one additional catalyst that enhances incorporation of hydrogen into said organic matter.

In one embodiment of the first, second, third and fourth aspects, the catalyst that enhances incorporation of hydrogen is selected from the group consisting of alkali metal formate catalysts, transition metal formate catalysts, reactive carboxylic acid catalysts, transition metal catalysts including their hydrides, sulphide catalysts, noble metal catalysts including their hydrides, water-gas-shift catalysts, and combinations thereof.

In one embodiment of the first, second, third and fourth aspects, the catalyst is sodium formate.

In one embodiment of the first, second, third and fourth aspects, the catalyst is a low-valent iron species including their hydrides, zero-valent iron homogeneous species, and zero-valent iron heterogeneous species.

In one embodiment of the first, second, third and fourth aspects, the treating comprises use of at least one additional catalyst that enhances removal of oxygen from said organic matter.

In one embodiment of the first, second, third and fourth aspects, the catalyst that enhances removal of oxygen from said organic matter is selected from the group consisting of alkali metal formate catalysts, transition metal formate catalysts, reactive carboxylic acid catalysts, transition metal catalysts, including their hydrides, sulphide catalysts, noble metal catalysts, including their hydrides, water-gas-shift catalysts, and combinations thereof.

In one embodiment of the first, second, third and fourth aspects, the organic matter is fossilised organic matter having a carbon content of at least 50%, and said solvent is an oil comprising less than 50 wt % water.

In one embodiment of the first, second, third and fourth aspects, the organic matter is fossilised organic matter having a carbon content of at least 60%, and said solvent is an oil comprising less than 50 wt % water.

In one embodiment of the first, second, third and fourth aspects, the organic matter is lignite, the temperature is between about 330° C. and about 350° C., and the pressure is between about 160 bar and about 250 bar.

In one embodiment the first, second, third and fourth aspects, the organic matter is lignocellulosic biomass, the temperature is between about 330° C. and about 350° C., and the pressure is between about 160 bar and about 250 bar.

In one embodiment the first, second, third and fourth aspects, the treating is for a time period of at least about 5 minutes.

In one embodiment the first, second, third and fourth aspects, the treating is for a time period of between about 5 minutes and about 25 minutes.

In one embodiment the first, second, third and fourth aspects, the treating is for a time period of between about 5 minutes and about 60 minutes.

In one embodiment the first, second, third and fourth aspects, the treating is for a time period of between about 10 minutes and about 20 minutes.

In one embodiment the first, second, third and fourth aspects, the treating is for a time period of about 15 minutes.

In one embodiment the first, second, third and fourth aspects, the biofuel comprises an oil component having a gross calorific value of more than 35 MJ/kg.

In one embodiment the first, second, third and fourth aspects, the bio fuel comprises an oil component having a gross calorific value of more than 37 MJ/kg.

In one embodiment the first, second, third and fourth aspects, the biofuel comprises an oil component having a gross calorific value of more than 40 MJ/kg.

In one embodiment the first, second, third and fourth aspects, the organic matter is in the form of a slurry comprising at least 30 wt % of said organic matter.

In one embodiment the first, second, third and fourth aspects, the organic matter is in organic matter is in the form of a slurry comprising at least 40 wt % of said organic matter.

In one embodiment the second, third and fourth aspects, the solvent comprises at least about 30 wt % oil.

In one embodiment the second, third and fourth aspects, the solvent comprises at least about 40 wt % oil.

In one embodiment the second, third and fourth aspects, the solvent comprises at least about 50 wt % oil.

In one embodiment the second, third and fourth aspects, the solvent comprises at least about 60 wt % oil.

In one embodiment the second, third and fourth aspects, the solvent comprises at least about 70 wt % oil.

In one embodiment the first, second, third and fourth aspects, the oil is selected from the group consisting of paraffinic oil, gas-oil, crude oil, synthetic oil, coal-oil, bio-oil, shale oil, kerogen oil, mineral oil, white mineral oil, and aromatic oil.

In one embodiment the first, second, third and fourth aspects, the oil is recycled from the biofuel.

In one embodiment of the second, third and fourth aspects, said treating provides a biofuel product comprising a first oil phase comprising: oil from said oil-based solvent and bio-oil derived from said organic matter; an aqueous phase comprising dissolved organic compounds; and a solid phase comprising a calorific char.

In one embodiment of the second, third and fourth aspects, said treating additionally provides a gaseous phase.

In one embodiment of the fourth aspect, said cooling and releasing provides a biofuel product comprising a first oil phase comprising: oil from said oil-based solvent and bio-oil derived from said organic matter; an aqueous phase comprising dissolved organic compounds; and a solid phase comprising of a calorific char.

In one embodiment of the first aspect, said releasing additionally provides a gaseous phase.

In one embodiment of the first, second, third and fourth aspects, said biofuel product further comprises a second oil phase comprising oil that is more polar than oil of said first oil phase. In a fifth aspect, the invention provides a biofuel produced by the method of the first, second or third aspects.

In one embodiment of the first, second, third, fourth and fifth aspects, the biofuel is a bio-oil.

BRIEF DESCRIPTION OF THE DRAWINGS

A preferred embodiment of the present invention will now be described, by way of an example only, with reference to the accompanying drawings wherein:

FIG. 1 is a schematic flow diagram showing an apparatus for converting organic matter into biofuel in accordance with an embodiment of the invention. Boxed numbers 1-12 correspond to stream nos. 1-12 shown in Table 1 below (left column) which provide exemplary stream composition characteristics.

Oil recycling ratios can be adjusted, shown here
Slurry oil: biomass 1
Selectivities of Conversion (all on a Dry Basis):

| | |
|---|---|
| Water-Borne (Humics, etc.) | 6 wt % |
| Oil yield (incl. useable water-borne fraction) (db) | 44 wt % |
| Gas yield | 50 wt % |

For a Plant Run with 20 Wt % Moisture in Biomass Feed:
  200,000 bone dry (0% moisture) tonnes per year, equals 250,000 wet tonnes per year
  Residence time: 8 min
  Throughput/hour: 31.6 tonnes/h
  Assume all densities to equal 1
  Reactor volume: 8.4 m^3
  Biooil (db) per hour: 11 tonnes/h
  Pipe id. 24 inches
  Reactor length: 28.8 m

DEFINITIONS

As used in this application, the singular form "a", "an" and "the" include plural references unless the context clearly dictates otherwise. For example, the term "a catalyst" also includes a plurality of catalysts.

As used herein, the term "comprising" means "including." Variations of the word "comprising", such as "comprise" and "comprises," have correspondingly varied meanings. Thus, for example, a material "comprising" oil may consist exclusively of oil or may include other additional substances.

As used herein, the terms "organic matter" and "organic materials" have the same meaning and encompass any material comprising carbon including both fossilised and non-fossilised materials. Non-limiting examples of organic matter include biomass, lignocellulosic matter, and hydrocarbon-containing materials (e.g. lignite, oil shale and peat).

As used herein, the term "biofuel" refers to an energy-containing material derived from the processing of organic matter. Non-limiting examples of biofuels include oils, bio-oils, char products (otherwise known as upgraded pulvarised coal injection (PCI) equivalent products), gaseous products, biodiesel, and alcohols (e.g. ethanol and butanol).

As used herein, the term "bio-oil" will be understood to encompass oil products derived from processing fossilised

TABLE 1 exemplary stream composition characteristics using a particular biomass feedstock Composition as WT %

| stream no. | water | water borne organics | biomass (DB) | oil (DB) | additives | reaction gases | quantity (tonnes/hr) | temp (° C.) |
|---|---|---|---|---|---|---|---|---|
| 1 | 20 | 0 | 79 | 0 | 1 | 0 | 31.6 | 25 |
| 2 | 15 | 0 | 39.5 | 45 | 0.5 | 0 | 63.1 | 90.6 |
| 3 | 15 | 0 | 39.5 | 45 | 0.5 | 0 | 63.1 | 90.6 |
| 4 | 15 | 0 | 39.5 | 45 | 0.5 | 0 | 63.1 | 350 |
| 5 | 15 | 2.4 | 0 | 62.4 | 0.5 | 20 | 63.1 | 350 |
| 6 | 15 | 2.4 | 0 | 62.4 | 0.5 | 20 | 63.1 | 150 |
| 7 | 10 | 0 | 0 | 0 | 0 | 90 | 13.7 | 25 |
| 8 | 70.3 | 24.5 | 0 | 0 | 5.2 | 0 | 6.1 | 150 |
| 9 | 10 | 0 | 0 | 90 | 0 | 0 | 43.3 | 150 |
| 10 | 70.3 | 24.5 | 0 | 0 | 5.2 | 0 | 6.1 | 25 |
| 11 | 10 | 0 | 0 | 90 | 0 | 0 | 11.8 | 25 |
| 12 | 10 | 0 | 0 | 90 | 0 | 0 | 31.6 | 150 |
| 13 | 10 | 0 | 0 | 90 | 0 | 0 | 31.6 | 150 | organic material (e.g. coals such as lignite), non-fossilised organic material (e.g. lignocellulosic matter), or mixtures thereof.

As used herein, the terms "lignocellulosic matter" and "lignocellulosic biomass" are used interchangeably and have the same meaning. The terms encompass any substance comprising lignin, cellulose, and hemicellulose.

As used herein, the term "aqueous solvent" refers to a solvent comprising at least one percent water based on total weight of solvent. An "aqueous solvent" may therefore comprise between one percent water and one hundred percent water based on total weight of solvent.

As used herein, the term "aqueous alcohol" refers to a solvent comprising at least one percent alcohol based on total weight of solvent.

As used herein, the term "aqueous ethanol" refers to a solvent comprising at least one percent ethanol based on total weight of solvent.

As used herein, the term "aqueous methanol" refers to a solvent comprising at least one percent methanol based on total weight of solvent.

As used herein, the term "oil-based solvent" refers to a solvent comprising any suitable oil, non-limiting examples of which include paraffinic oil, gas-oil, crude oil, synthetic oil, coal-oil, bio-oil, shale oil/kerogen oil, aromatic oils (i.e. single or muffins ringed components or mixtures thereof), ether extractables, hexane extractables and any mixture of any of the previous components.

As used herein, a "supercritical" substance (e.g. a supercritical solvent) refers to a substance that is heated above its critical temperature and pressurised above its critical pressure (i.e. a substance at a temperature and pressure above its critical point).

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, an "additional catalyst" is a catalyst that is supplementary to catalytic compounds intrinsically present in organic matter treated in accordance with the methods of the invention, catalytic compounds intrinsically present in an oil-based solvent used in accordance with the methods of the invention, and/or catalytic compounds intrinsically present in the walls of a reactor apparatus used to perform the methods of the invention.

As used herein, the term "intrinsic catalyst" will be understood to be a catalyst that is innately present in a given reaction component such as, for example, any one or more of organic matter feedstock, an aqueous solvent, and/or vessel walls of a reactor apparatus.

It will be understood that use of the term "about" herein in reference to a recited numerical value (e.g. a temperature or pressure) includes the recited numerical value and numerical values within plus or minus ten percent of the recited value.

It will be understood that use of the term "between" herein when referring to a range of numerical values encompasses the numerical values at each endpoint of the range. For example, a temperature range of between 10° C. and 15° C. is inclusive of the temperatures 10° C. and 15° C.

Any description of a prior art document herein, or a statement herein derived from or based on that document, is not an admission that the document or derived statement is a part of the common general knowledge of the relevant art.

For the purposes of description all documents referred to herein are incorporated by reference in their entirety unless otherwise stated.

DETAILED DESCRIPTION OF THE INVENTION

Current methods for the production of bio-oil from organic matter suffer from a number of drawbacks. Apart from the generally high oxygen content and poor stability of most bio-oils, the need to conduct depolymerisation reactions at high temperature and pressure requires a reactor apparatus (e.g. continuous flow reactors, batch reactors and the like) introducing additional difficulties.

For example, water is generally used as the primary depolymerisation agent in hydrothermal liquefaction processes (e.g. hydrothermal upgrading (HTU) and catalytic hydrothermal reactor technology (Cat-HTR)). The use of water restricts the concentration of organic matter (e.g. lignocellulosic biomass) that can be used in slurry feedstock in a reactor due to swelling. Moreover, high energy levels are required to heat water up to reaction temperature (and maintain it there) resulting in charring on the inside of the reactor vessel walls. Although the use of a suitable co-solvent such as ethanol offers a potential means of reducing charring it also significantly increases the overall cost of the process. Ballistic heating is another method that may be used to minimise charring. This process involves the rapid convergence of two separate streams (a slurry stream and a sub/supercritical water stream) in a ballistic heating chamber. However, the cost of the supercritical boiler used in ballistic heating and associated water de-ionisation stage has a significantly adverse effect on cost efficiency.

A further disadvantage of bio-oil production by hydrothermal liquefaction of organic matter is that the product typically comprises multiple layers of oil having different chemical properties. Separation of the different layers can be difficult and requires additional resources.

The present invention relates to the unexpected finding that at least one of the aforementioned disadvantages can be alleviated by incorporating oil into solvents utilised in hydrothermal liquefaction processes. Without limitation to a particular mechanism of action, it is postulated that the reactive depolymerisation agent (water) in these processes depolymerises the organic matter feedstock (e.g. lignocellulosic biomass, peat, lignite and the like brown) by reacting with their oxygen-containing bonds in a reaction commonly referred to as hydrolysis. Water is also the processing liquid that carries the feedstock through the reactor assembly. Using the methods of the present invention, at least part of this processing liquid is changed to an oil such as, for example, an unreactive oil or a reactive oil (e.g. multi-ring aromatics which can be reversibly hydrogenated) that can effect hydrogen transfer, or a mixture of both. Although it is envisaged that the initial processing liquid ("start-up") may contain oil/s (e.g. paraffinic oil) and/or water from external sources, at steady-state operation it is possible to run the process using recycled product oil and/or process water as processing medium (as exemplified in FIG. 1).

Accordingly, certain aspects of the present invention relate to methods for producing biofuel by treating organic matter with oil-based solvents at increased temperature and pressure. Additional aspects of the present invention relate to biofuel products generated by the methods described herein.

The methods of the present invention are demonstrated to provide several notable advantages. For example, the proportion of feedstock in the slurry used can be much higher as swelling of the feedstock is prevented in the low temperature zone where it is brought up to pressure. This in turn allows for increased throughput and a significant decrease in reactor size. Secondly, the heat transfer into the oil is more facile reducing the energy required the slurry. This in turn reduces charring and facilitates the use of smaller heat-exchangers.

In addition, the product of the liquefaction is situated in the oil layer and can be easily separated by centrifugation, eliminating the need to evaporate large amounts of water. The oil layer may also remove intermediate species from the water phase, influencing equilibria, thereby making it possible to tune the reaction towards producing more bio-oil/more deoxygenated bio-oils.

Overall, the methods of the present invention facilitate the use of a much smaller plant in terms of heat-exchangers, reactor size and/or product separation train (thus providing substantial CapEx and/or OpEx cost-savings).

Organic Matter

The present invention provides methods for the conversion of organic matter into biofuel. As used herein, "organic matter" (also referred to herein as "organic material") encompasses any matter comprising carbon, including both fossilised and non-fossilised forms of carbon-comprising matter.

No limitation exists regarding the particular type of organic matter utilised in the methods of the invention, although it is contemplated that certain forms of organic matter (e.g. fossilised organic matter) may be more suitable than others.

Organic matter utilised in the methods of the invention may comprise naturally occurring organic matter (e.g. lignocellulosic biomass or fossil fuel materials including lignite, oil shale, peat and the like) and/or synthetic organic materials (e.g. synthetic rubbers, plastics, nylons and the like). Organic matter utilised in the methods of the invention may comprise fossilised organic material (e.g. lignite) and/or non-fossilised organic material (e.g. lignocellulosic matter). In the case where more than one type (i.e. a mixture) of organic matter is utilised, no limitation exists regarding the particular proportion of the different components of organic matter.

In some preferred embodiments, organic matter utilised in the methods of the invention comprises fossilised organic matter. "Fossilised organic matter" as contemplated herein encompasses any organic material that has been subjected to geothermal pressure and temperature for a period of time sufficient to remove water and concentrate carbon to significant levels.

For example, fossilised organic material may comprise more than about 10%, 20%, 30%, 40%, 50%, 60%, 70%, 75%, 80%, 85%, 90% or 95 wt % carbon. Preferably, the fossilised organic material may comprise more than about 50 wt % carbon, more than about 60 wt % carbon, or more than about 70% weight carbon. Non-limiting examples of such materials include coals (e.g. anthracitic coals such as meta-anthracite, anthracite and semianthracite; bituminous coals; subbituminous coals; lignite (i.e. brown coal), coking coal, coal tar, coal tar derivatives, coal char), cokes (e.g. high temperature coke, foundry coke, low and medium temperature coke, pitch coke, petroleum coke, coke oven coke, coke breeze, gas coke, brown coal coke, semi coke), peat (e.g. milled peat, sod peat), kerogen, tar sands, oil shale, shale tar, asphalts, asphaltines, natural bitumen, bituminous sands, or any combination thereof.

In other preferred embodiments, organic matter utilised in the methods of the invention comprises lignocellulosic matter. As used herein, "lignocellulosic matter" refers to any substance comprising lignin, cellulose and hemicellulose.

For example, the lignocellulosic matter may be a woody plant or component thereof. Examples of suitable woody plants include, but are not limited to, pine (e.g. *Pinus radiata*), birch, eucalyptus, bamboo, beech, spruce, fir, cedar, poplar, willow and aspen. The woody plants may be coppiced woody plants (e.g. coppiced willow, coppiced aspen).

Additionally or alternatively, the lignocellulosic matter may be a fibrous plant or a component thereof. Non-limiting examples of fibrous plants (or components thereof) include grasses (e.g. switchgrass), grass clippings, flax, corn cobs, corn stover, reed, bamboo, bagasse, hemp, sisal, jute, cannibas, hemp, straw, wheat straw, abaca, cotton plant, kenaf, rice hulls, and coconut hair.

Additionally or alternatively, the lignocellulosic matter may be derived from an agricultural source. Non-limiting examples of lignocellulosic matter from agricultural sources include agricultural crops, agricultural crop residues, and grain processing facility wastes (e.g. wheat/oat hulls, corn fines etc.). In general, lignocellulosic matter from agricultural sources may include hard woods, soft woods, hardwood stems, softwood stems, nut shells, branches, bushes, canes, corn, corn stover, cornhusks, energy crops, forests, fruits, flowers, grains, grasses, herbaceous crops, wheat straw, switchgrass, *salix*, sugarcane bagasse, cotton seed hairs, leaves, bark, needles, logs, roots, saplings, short rotation woody crops, shrubs, switch grasses, trees, vines, cattle manure, and swine waste.

Additionally or alternatively, the lignocellulosic matter may be derived from commercial or virgin forests (e.g. trees, saplings, forestry or timber processing residue, scrap wood such as branches, leaves, bark, logs, roots, leaves and products derived from the processing of such materials, waste or byproduct streams from wood products, sawmill and paper mill discards and off-cuts, sawdust, and particle board).

Additionally or alternatively, the lignocellulosic matter may be derived from industrial products and by-products. Non-limiting examples include wood-related materials and woody wastes and industrial products (e.g. pulp, paper (e.g. newspaper) papermaking sludge, cardboard, textiles and cloths, dextran, and rayon).

It will be understood that organic material used in the methods of the invention may comprise a mixture of two or more different types of lignocellulosic matter, including any combination of the specific examples provided above.

The relative proportion of lignin, hemicellulose and cellulose in a given sample will depend on the specific nature of the lignocellulosic matter.

By way of example only, the proportion of hemicellulose in a woody or fibrous plant used in the methods of the invention may be between about 15% and about 40%, the proportion of cellulose may be between about 30% and about 60%, and the proportion of lignin may be between about 5% and about 40%. Preferably, the proportion of hemicellulose in the woody or fibrous plant may be between about 23% and about 32%, the proportion of cellulose may be between about 38% and about 50%, and the proportion of lignin may be between about 15% and about 25%.

In some embodiments, lignocellulosic matter used in the methods of the invention may comprise between about 2% and about 35% lignin, between about 15% and about 45% cellulose, and between about 10% and about 35% hemicellulose.

In other embodiments, lignocellulosic matter used in the methods of the invention may comprise between about 20% and about 35% lignin, between about 20% and about 45% cellulose, and between about 20% and about 35% hemicellulose.

In some embodiments, the lignocellulosic matter may comprise more than about 5%, 10%, 15%, 20%, 25%, 30%, 35%, 40%, 45%, or 50% lignin.

In some embodiments, the lignocellulosic matter may comprise more than about 5%, 10%, 15%, 20%, 25%, 30%, 35%, 40%, 45%, or 50% cellulose.

In some embodiments, the lignocellulosic matter may comprise more than about 5%, 10%, 15%, 20%, 25%, 30%, 35%, 40%, 45%, or 50% hemicellulose.

The skilled addressee will recognize that the methods described herein are not constrained by the relative proportions of lignin, hemicellulose and cellulose in a given source of lignocellulosic matter.

In certain embodiments of the invention, a mixture of organic material comprising lignite (brown coal) and lignocellulosic matter may be utilised in the methods of the invention. The lignocellulosic matter of the mixture may, for example, comprise woody plant material and/or fibrous plant material. The proportion of lignite in the mixture may be greater than about 20%, 40%, 60% or 80%. Alternatively, the proportion of lignocellulosic matter in the mixture may be greater than about 20%, 40%, 60% or 80%.

In some preferred embodiments, organic matter utilised in the methods of the invention comprises carbon-containing polymeric materials, non-limiting examples of which include rubbers (e.g. tyres), plastics and polyamides (e.g. nylons).

Non-limiting examples of suitable rubbers include natural and synthetic rubbers such as polyurethanes, styrene rubbers, neoprenes, polybutadiene, fluororubbers, butyl rubbers, silicone rubbers, plantation rubber, acrylate rubbers, thiokols, and nitrile rubbers.

Non-limiting examples of suitable plastics include PVC, polyethylene, polystyrene, terphtalate, polyethylene and polypropylene.

Organic matter utilised in the methods of the invention may comprise carbon-containing wastes such as sewage, manure, or household or industrial waste materials.

Pre-Treatment of Organic Matter

Organic matter utilised in the methods of the invention may optionally be pre-treated prior to performing the conversion of the matter to biofuel.

It will be recognised that no strict requirement exists to perform a pre-treatment step when using the methods of the invention. For example, pre-treatment of the organic matter may not be required if it is obtained in the form of a liquid or in a particulate form. However, it is contemplated that in many cases pre-treatment of the organic matter may be advantageous in enhancing the outcome of the biofuel production methods described herein.

In general, pre-treatment may be used to break down the physical and/or chemical structure of the organic matter making it more accessible to various reagents utilised in the methods of the invention (e.g. oil-based solvent, catalysts and the like) and/or other reaction parameters (e.g. heat and pressure). In certain embodiments, pre-treatment of organic matter may be performed for the purpose of increasing solubility, increasing porosity and/or reducing the crystallinity of sugar components (e.g. cellulose). Pre-treatment of the organic matter may be performed using an apparatus such as, for example, an extruder, a pressurized vessel, or batch reactor.

Pre-treatment of the organic matter may comprise physical methods, non-limiting examples of which include grinding, chipping, shredding, milling (e.g. vibratory ball milling), compression/expansion, agitation, and/or pulse-electric field (PEF) treatment.

Additionally or alternatively, pre-treatment of the organic matter may comprise physio-chemical methods, non-limiting examples of which include pyrolysis, steam explosion, ammonia fiber explosion (AFEX), ammonia recycle percolation (ARP), and/or carbon-dioxide explosion. Pre-treatment with steam explosion may additionally involve agitation of the organic matter.

Additionally or alternatively, pre-treatment of the organic matter may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), oxidative delignification (i.e. lignin biodegradation catalysed by the peroxidase enzyme in the presence of $H_2O_2$), and/or the organosolvation method (i.e. use of an organic solvent mixture with inorganic acid catalysts such as $H_2SO_4$ and/or HCl to break lignin-hemicellulose bonds).

Additionally or alternatively, pre-treatment of the organic matter may comprise biological methods, non-limiting examples of which include the addition of microorganisms (e.g. rot fungi) capable of degrading/decomposing various component(s) of the organic matter.

In some embodiments, organic matter used in the methods of the invention is lignocellulosic matter subjected to an optional pre-treatment step in which hemicellulose is extracted. Accordingly, the majority of the hemicellulose (or indeed all of the hemicellulose) may be extracted from the lignocellulosic matter and the remaining material (containing predominantly cellulose and lignin) used to produce a biofuel by the methods of the invention. However, it will be understood that this pre-treatment is optional and no requirement exists to separate hemicellulose from lignocellulosic matter when performing the methods of the invention. Suitable methods for the separation of hemicellulose from lignocellulosic matter are described, for example, in PCT publication number WO/2010/034055, the entire contents of which are incorporated herein by reference.

For example, the hemicellulose may be extracted from lignocellulosic matter by subjecting a slurry comprising the lignocellulosic matter (e.g. 5%-15% w/v solid concentration) to treatment with a mild aqueous acid (e.g. pH 6.5-6.9) at a temperature of between about 100° C. and about 250° C., a reaction pressure of between about 2 and about 50 atmospheres, for between about 5 and about 20 minutes. The solubilised hemicellulose component may be separated from the remaining solid matter (containing predominantly cellulose and lignin) using any suitable means (e.g. by use of an appropriately sized filter). The remaining solid matter may be used directly in the methods of the invention, or alternatively mixed with one or more other forms of organic matter (e.g. lignite) for use in the methods of the invention.

Slurry Characteristics

Organic matter utilised in accordance with the methods of the present invention is preferably treated in the form of a slurry. The slurry may be generated, for example, by generating a particulate form of the organic matter (e.g. by physical methods such as those referred to above and/or by other means) and mixing with an appropriate liquid (e.g. an aqueous solvent and/or an oil).

Oil Component

In some preferred embodiments of the invention, the slurry comprises organic matter mixed with an oil-based solvent. The oil may be any suitable oil, non-limiting examples of which include paraffinic oil, gas-oil, crude oil, synthetic oil, coal-oil, bio-oil, shale oil/kerogen oil, aromatic oils (i.e. single or multi-ringed components or mixtures thereof), ether extractables, hexane extractables and any mixture of any of the previous components. The oil may be incorporated into the slurry mixture at any point before target reaction temperature and/or pressure are reached. For example, the oil may be added to the slurry in a slurry mixing tank as shown in FIG. 1. Additionally or alternatively, the oil may be added to the slurry en route to a reactor and/or during heating/pressurisation of the slurry.

In particularly preferred embodiments, the oil is a bio-oil recycled from the product of the process. For example, a portion of the bio-oil produced may be taken off as a side stream and recycled into the slurry.

No particular limitation exists regarding the proportion of oil in a slurry comprising organic matter treated in accordance with the methods of the present invention. For example, the slurry may comprise more than about 2 wt % oil, more than about 5 wt % oil, more than about 10 wt % oil, or more than about 20, 30, 40, 50, 60 or 70 wt % oil. Alternatively, the slurry may comprise less than about 98 wt % oil, less than about 95 wt % oil, less than about 90 wt % oil, or less than about 80, 70, 60, 50, 40 or 30 wt % oil.

In some preferred embodiments, the slurry comprises between about 40 wt % and about 50 wt % oil. In other preferred embodiments, the slurry comprises about 45 wt % oil.

In other preferred embodiments the slurry comprises a feedstock to oil ratio of 0.5-1.2:1. The oil may be paraffinic oil.

Organic Matter Component

In certain embodiments of the invention, the concentration of solid matter in the slurry may be less than about 85 wt %, less than about 75 wt %, or less than about 50 wt %. Alternatively, the concentration of solid matter may be more than about 10 wt %, more than about 20 wt %, more than about 30 wt %, more than about 40 wt %, more than about 50 wt %, or more than about 60 wt %. In some preferred embodiments the slurry comprises between about 35 wt % and about 45 wt % oil. In other preferred embodiments, the slurry comprises about 40 wt % oil or 39.5 wt % oil.

The optimal particle size of solid components and the optimal concentration of solids in the slurry may depend upon factors such as, for example, the heat transfer capacity of the organic matter utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of solid components in a slurry used for the methods of the invention can readily be determined by a person skilled in the art using standard techniques. For example, a series of slurries may be generated, each sample in the series comprising different particle sizes and/or different concentrations of solid components compared to the other samples. Each slurry can then be treated in accordance with the methods of the invention under a conserved set of reaction conditions. The optimal particle size and/or concentration of solid components can then be determined upon analysis and comparison of the products generated from each slurry using standard techniques in the art.

In certain embodiments of the invention, the particle size of solid components in the slurry may be between about 10 microns and about 10,000 microns. For example, the particle size may be more than about 50, 100, 500, 750, 1000, 2000, 3000, 4000, 5000, 6000, 7000, 8000 or 9000 microns. Alternatively, the particle size may less than about 50, 100, 500, 750, 1000, 2000, 3000, 4000, 5000, 6000, 7000, 8000 or 9000 microns. In some embodiments, the particle size is between about 10 microns and about 50 microns, between about 10 microns and about 100 microns, between about 10 microns and about 200 microns, between about 10 microns and about 500 microns, between about 10 microns and about 750 microns, or between about 10 microns and about 1000 microns. In other embodiments, the particle size is between about between about 100 microns and about 1000 microns, between about 100 microns and about 750 microns, between about 100 microns and about 500 microns, or between about 100 microns and about 250 microns.

Water Component

In certain embodiments of the invention, the concentration of water in the slurry may be above about 80 wt %, above about 85 wt %, or above about 90 wt %. Accordingly, the concentration of water may be above about 75 wt %, above about 70 wt %, above about 60 wt %, above about 50 wt %, above about 40 wt %, or above about 30 wt %. In some embodiments, the concentration of water is between about 90 wt % and about 95 wt %.

In some preferred embodiments the slurry comprises between about 10 wt % and about 30 wt % water. In other preferred embodiments, the slurry comprises about 20 wt % oil or about 15 wt % water.

In particularly preferred embodiments, the water is recycled from the product of the process. For example, a portion water present following completion of the reaction may be taken off as a side stream and recycled into the slurry.

Aqueous Alcohol Component

In certain embodiments of the invention, the slurry may contain one or more different aqueous alcohol/s. However, it is emphasised that the inclusion of alcohols is optional rather than a requirement. For example, it may be suitable or preferable to use an aqueous alcohol as the solvent when the organic matter used in the methods consists of or comprises a significant amount of lignocellulosic material and/or other materials such rubber and plastics due to the stronger chemical bonds in these types of organic matter.

Suitable alcohols may comprise between one and about ten carbon atoms. Non-limiting examples of suitable alcohols include methanol, ethanol, isopropyl alcohol, isobutyl alcohol, pentyl alcohol, hexanol and iso-hexanol.

The slurry may comprise more than about 5 wt %, 10 wt %, 15 wt %, 20 wt %, 25 wt %, 30 wt %, 35 wt %, 40 wt %, 45 wt % or 50 wt % alcohol aqueous alcohol.

In certain embodiments, the solvent comprises a mixture of two or more aqueous alcohols. Preferably, the alcohol is ethanol, methanol or a mixture thereof.

Catalysts

In accordance with the methods of the invention, organic matter may be treated with an oil-containing solvent under conditions of increased temperature and pressure to produce a biofuel product. The treatment may be enhanced by the use of one or more additional catalysts. Although some catalysts may be an intrinsic component of the organic matter (e.g. minerals), solvent (e.g. hydronium/hydroxide ions of water, compound/s in the oil), and/or vessel walls of a reactor apparatus in which the organic matter may be treated (e.g. transition/noble metals), the invention contemplates the use of additional catalyst(s) to enhance the production of biofuel from organic material.

Accordingly, certain embodiments of the invention relate to the production of biofuel from organic matter by treatment with an oil-containing solvent under conditions of increased temperature and pressure in the presence of at least one additional catalyst. By "additional catalyst" it will be understood that the catalyst is supplementary to catalytic compounds intrinsically present in the organic matter, oil-containing solvent and/or walls of a reactor apparatus.

For example, an embodiment of the invention in which a feedstock is treated with an oil-based solvent (only) under conditions of increased temperature and pressure in a reactor apparatus would not be considered to utilise an "additional catalyst".

In contrast, an embodiment of the invention in which a feedstock is treated with an oil-based solvent in the presence of a supplementary base catalyst (e.g. sodium hydroxide) under conditions of increased temperature and pressure in a reactor apparatus would be considered to utilise an "additional catalyst".

Although the use of additional catalyst/s may be advantageous in certain circumstances, the skilled addressee will recognise that the methods of the invention may be performed without using them.

An additional catalyst as contemplated herein may be any catalyst that enhances the formation of biofuel from organic matter using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, and combinations thereof. Suitable catalysts are described, for example, in Australian provisional patent application number 2010901473 entitled "Methods for biofuel production", the entire contents of which are incorporated herein by reference.

The optimal quantity of an additional catalyst used in the methods of the invention may depend on a variety of different factors including, for example, the type of organic matter under treatment, the volume of organic matter under treatment, the solvent utilised, the specific temperature and pressure employed during the reaction, the type of catalyst and the desired properties of the biofuel product. By following the methods of the invention, the optimal quantity of an additional catalyst to be used can be determined by one skilled in the art without inventive effort.

In certain embodiments, an additional catalyst or combination of additional catalysts may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the solvent).

In general, the catalysts may be used to create or assist in forming and/or maintaining a reducing environment favouring the conversion of organic matter to biofuel. The reducing environment may favour hydrolysis of the organic matter, drive the replacement of oxygen with hydrogen, and/or stabilise the biofuel formed.

Treatment under subcritical conditions (as opposed to supercritical conditions) may be advantageous in that less energy is required to perform the methods and reaction components may be better preserved during treatment. When subcritical conditions are utilised it is contemplated that the additional use of one or more catalysts may be particularly beneficial in increasing the yield and/or quality of the biofuel. Further, the cost benefits of reduced input energy (i.e. to maintain subcritical rather than supercritical conditions) and preservation of the solvent may significantly outweigh the extra cost incurred by additionally including one or more of the catalysts described herein.

It is contemplated that under conditions of increased temperature and pressure water molecules in the solvent may dissociate into acidic (hydronium) and basic (hydroxide) ions facilitating hydrolysis of solid matter under treatment (i.e. solid to liquid transformation). In certain embodiments, the temperature and pressure at which the reaction is performed may be sufficiently high for desired levels of hydrolysis to occur without the use of additional catalysts. In other cases, the temperature and pressure at which the reaction is performed may not be sufficiently high for desired levels of hydrolysis to occur without the further addition of catalysts.

The additional catalysts may be hydrolysis catalysts. In certain embodiments, the hydrolysis catalysts may be base catalysts. Any suitable base catalyst may be used.

Non-limiting examples of suitable base catalysts for hydrolysis include alkali metal salts, transition metal salts, organic bases, and mixtures thereof.

The alkali metal salts or transition metal salts may comprise any inorganic anion(s), non-limiting examples of which include sulfate, sulfite, sulfide, disulfide, phosphate, aluminate, nitrate, nitrite, silicate, hydroxide, methoxide, ethoxide, alkoxide, carbonate and oxide.

Preferred alkali metal or transition metal salts are sodium, potassium, iron, calcium and barium salts, and may comprise one or more anions selected from phosphate, aluminate, silicate, hydroxide, methoxide, ethoxide, carbonate, sulphate, sulphide, disulphide and oxide.

Non-limiting examples of suitable organic bases include ammonia, basic and polar amino-acids (e.g. lysine, histidine, arginine), benzathin, benzimidazole, betaine, cinchonidine, cinchonine, diethylamine, diisopropylethylamine, ethanolamine, ethylenediamine, imidazole, methyl amine, N-methylguanidine, N-methylmorpholine, N-methylpiperidine, phosphazene bases, picoline, piperazine, procain, pyridine, quinidine, quinoline, trialkylamine, tributylamine, triethyl amine, trimethylamine and mixtures thereof.

In certain embodiments, the hydrolysis catalysts may be acid catalysts although it will be recognised that acid catalysts may generally slower in catalysing hydrolysis of the organic matter than base catalysts. Any suitable acid catalyst may be used.

Non-limiting examples of suitable acid catalysts for hydrolysis include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments, the acid catalyst(s) for hydrolysis may be present in minerals of the organic matter and/or derived from the in situ formation of carboxylic acids and/or phenolics during the treatment process.

In certain embodiments of the invention, a mixture of one or more acid hydrolysis catalysts and one or more base hydrolysis catalysts may be used to enhance hydrolysis of solid matter under treatment.

The methods of the invention may employ catalysts for hydrolysis of the organic matter (as discussed in the preceding paragraphs). Additionally or alternatively, the methods may utilise catalysts that increase and/or accelerate the removal of oxygen (either directly or indirectly) from compounds in the organic matter under treatment. The removal of oxygen may provide a number of advantageous effects such as, for example, increasing the energy content and stability of the biofuel produced.

An acid catalyst may be used to enhance the removal of oxygen, for example, by dehydration (elimination) of water. Accordingly, in certain embodiments an acid catalyst may be used to enhance hydrolysis, and to enhance the removal of oxygen from organic matter under treatment.

Any suitable acid catalyst may be used to enhance oxygen removal. Non-limiting examples of suitable acid catalysts for oxygen removal include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments alumino-silicates including hydrated forms (e.g. zeolites) may be used during the treatment of organic matter to assist in dehydration (elimination) of water.

Additionally or alternatively, the removal of oxygen may be enhanced by thermal means involving decarbonylation of, e.g. aldehydes (giving $R_3C-H$ and CO gas) and decarboxylation of carboxylic acids in the material under treatment (giving $R_3C-H$ and $CO_2$ gas). The speed of these reactions may be enhanced by the addition of acid and/or transition (noble) metal catalysts. Any suitable transition or noble metal may be used including those supported on solid acids. Non-limiting examples include $Pt/Al_2O_3/SiO_2$, $Pd/Al_2O_3/SiO_2$, $Ni/Al_2O_3/SiO_2$, and mixtures thereof.

Additionally or alternatively, a combined acid and hydrogenation catalyst may be used to enhance the removal of oxygen, for example, by hydrodeoxygenation (i.e. elimination of water (via acid component) and saturation of double bonds (via metal component)). Any suitable combined acid and hydrogenation catalyst may be used including those supported on solid acids. Non-limiting examples include $Pt/Al_2O_3/SiO_2$, $Pd/Al_2O_3/SiO_2$, $Ni/Al_2O_3/SiO_2$, $NiO/MoO_3$, $CoO/MoO_3$, $NiO/WO_2$, zeolites loaded with noble metals (e.g. ZSM-5, Beta, ITQ-2), and mixtures thereof.

The methods of the invention may employ catalysts that enhance hydrolysis of the organic matter under treatment, and/or catalysts that enhance the removal of oxygen from compounds in the organic matter (as discussed in the preceding paragraphs). Additionally or alternatively, the methods may utilise catalysts that enhance the concentration of hydrogen (either directly or indirectly) into compounds of the organic matter under treatment. The concentration of hydrogen may provide a number of advantageous effects such as, for example, increasing the energy content and stability of the biofuel produced.

A transfer hydrogenation catalyst may be used to enhance the concentration of hydrogen into compounds of the organic matter under treatment, for example, by transfer hydrogenation or in situ hydrogen generation.

Any suitable transfer hydrogenation catalyst may be used to increase the concentration of hydrogen. Non-limiting examples of suitable transfer hydrogenation catalysts include alkali metal hydroxides (e.g. sodium hydroxide), transition metal hydroxides, alkali metal formates (e.g. sodium formate), transition metal formates, reactive carboxylic acids, transition or noble metals, and mixtures thereof.

In certain embodiments, an additional sodium hydroxide catalyst is utilised in the reaction mixture at a concentration of between about 0.1M and about 0.5M.

In other embodiments low-valent iron species catalysts (including their hydrides) are utilised in the reaction mixture, including iron zero homogeneous and heterogeneous species.

The alkali metal hydroxide or formate may comprise any suitable alkali metal. Preferred alkali metals include sodium, potassium, and mixtures thereof. The transition metal hydroxide or formate may comprise any suitable transition metal, preferred examples including Fe and Ru. The reactive carboxylic acid may be any suitable carboxylic acid, preferred examples including formic acid, acetic acid, and mixtures thereof. The transition or noble metal may be any suitable transition or noble metal, preferred examples including platinum, palladium, nickel, ruthenium, rhodium, and mixtures thereof.

Additionally or alternatively, a transition metal catalyst may be used to enhance the concentration of hydrogen into organic matter under treatment, for example, by hydrogenation with $H_2$. Non-limiting examples of suitable transition metal catalysts for hydrogenation with $H_2$ include zero-valent metals (e.g. iron, platinum, palladium, and nickel), transition metal sulfides (e.g. iron sulfide (FeS, $Fe_xS_y$), and mixtures thereof.

Additionally or alternatively, a water gas shift catalyst may be used to enhance the concentration of hydrogen into organic matter under treatment (i.e. via a water-gas shift reaction). Any suitable water gas shift (WGS) catalyst may be used including, for example, transition metals, transition metal oxides, and mixtures thereof (e.g. magnetite, platinum-based WGS catalysts, finely divided copper and nickel).

Additionally or alternatively, the concentration of hydrogen into organic matter under treatment may be facilitated by in situ gasification (i.e. thermal catalysis). The in situ gasification may be enhanced by the addition transition metals. Any suitable transition metal may be used including, for example, those supported on solid acids (e.g. $Pt/Al_2O_3/SiO_2$, $Pd/Al_2O_3/SiO_2$, $Ni/Al_2O_3/SiO_2$, and mixtures thereof), and transition metal sulfides (e.g. $Fe_xS_y$, $FeS/Al_2O_3$, $FeS/SiO_2$, $FeS/Al_2O_3/SiO_2$, and mixtures thereof). Table 2 below provides a summary of various exemplary catalysts that may be employed in the methods of the invention and the corresponding reactions that they may catalyse.

TABLE 2 summary catalysts and corresponding reactions

| Reaction Type | Catalyst Family | Catalyst Family Member | Specific example(s) | Preferred catalysts/ comments |
|---|---|---|---|---|
| Hydrolysis | Base catalysts | Sub/super-critical water | Hydroxide ion in sub/super-critical water | |
| | | All alkali and transition metal salts, both cations and anions can contribute. Include all common inorganic anions | M = any alkali or transition metal A = anions, including: aluminate, sulfate, sulfite, sulfide phosphate, phosphite nitrate, nitrite silicate hydroxide alkoxide carbonate oxide | M = Na, K, Fe, Ca, Ba A = aluminate, phosphate, silicate, hydroxide, methoxide, ethoxide carbonate sulphate sulphide disulphide ($FeS_2$) oxide |
| | | Any organic base | ammonia, pyridine, etc. | |
| Hydrolysis | Acid catalysts (slower) | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |
| Dehydration (elimination) | Acid catalysts | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals. zeolites or alumino-silicates in general may be added |
| Transfer Hydrogenation or in-situ $H_2$ generation | Transfer hydrogenation catalysts | All alkali and transition metal hydroxides and formates | M = any alkali or transition metal | M = Na, K |
| | | | A = hydroxide, formate | A = hydroxide, formate formic, acetic |
| | | All reactive carboxylic acids | | |
| | | All transition and noble metals | All transition and noble metals | M = Fe, Pd, Pd, Ni Ru Rh |
| Decarboxylation | Largely thermal | Acid and transition (noble) metal cats have been reported to aid the process | All transition and noble metals supported on solid acids | $Pt/Al_2O3/SiO_2$ $Pd/Al_2O_3/SiO_2$ $Ni/Al_2O_3/SiO_2$ |

TABLE 2-continued summary catalysts and corresponding reactions

| Reaction Type | Catalyst Family | Catalyst Family Member | Specific example(s) | Preferred catalysts/ comments |
|---|---|---|---|---|
| Decarbonylation | Largely thermal | As for decarboxylation | As for decarboxylation | As for decarboxylation |
| In-situ gasification | Largely thermal | Transition metals | supported transition metals | $Pt/Al_2O_3/SiO_2$ $Pd/Al_2O_3/SiO_2$ $Ni/Al_2O_3/SiO_2$ Fe |
| | | | sulfides | $Fe_xS_y$ $FeS/Al_2O_3$ $FeS/SiO_2$ $FeS/Al_2O_3/SiO_2$ |
| Water-Gas Shift | WGS catalysts | Standard WGS catalysts | As per literature | As per literature |
| Direct Hydrogenation with $H_2$ | Transition metals | Zero valent metals Sulfides | | Fe, Pt, P, Ni as zero valent FeS, $Fe_xS_y$ |
| Hydrode-oxygenation | Combined acid and hydrogenation catalyst | Transition metal and solid acid | M = transition metal A = acidic solid | $Pt/Al_2O_3/SiO_2$ $Pd/Al_2O_3/SiO_2$ $Ni/Al_2O_3/SiO_2$ $NiO/MoO_3$ $CoO/MoO_3$ $NiO/WO_2$ zeolites loaded with noble metals, e.g. ZSM-5, Beta, ITQ-2 |

Catalysts for use in the methods of the invention may be produced using chemical methods known in the art and/or purchased from commercial sources.

It will be understood that no particular limitation exists regarding the timing at which the additional catalyst(s) may be applied when performing the methods of the invention. For example, the catalyst(s) may be added to the organic matter, solvent, or a mixture of the same (e.g. aslurry) before heating/pressurisation to target reaction temperature and pressure, during heating/pressurisation to target reaction temperature and pressure, and/or after reaction temperature and pressure are reached. The timing of catalyst addition may depend on the reactivity of the feedstock utilised. For example, highly reactive feedstocks may benefit from catalyst addition close to or at the target reaction temperature and pressure, whereas less reactive feedstocks may have a broader process window for catalyst addition (i.e. the catalysts may be added prior to reaching target reaction temperature and pressure).

Reaction Conditions

In accordance with the methods of the invention, organic matter may be treated with an oil-based solvent under conditions of increased temperature and pressure to produce biofuel.

The specific conditions of temperature and pressure used when practicing the methods of the invention may depend on a number different factors including, for example, the type of oil-based solvent used, the type of organic matter under treatment, the physical form of the organic matter under treatment, the relative proportions of components in the reaction mixture (e.g. the proportion of water, oil, organic matter and any other additional component/s such as, for example, catalyst/s and/or alcohol/s), the types of catalyst(s) utilised (if present), the retention time, and/or the type of apparatus in which the methods are performed. These and other factors may be varied in order to optimise a given set of conditions so as to maximise the yield and/or reduce the processing time. In preferred embodiments, all or substantially all of the organic material used as a feedstock is converted into biofuel.

Desired reaction conditions may be achieved, for example, by conducting the reaction in a suitable apparatus (e.g. a sub/supercritical reactor apparatus) capable of maintaining increased temperature and increased pressure.

Temperature and Pressure

According to the methods of the present invention a reaction mixture is provided and treated at a target temperature and pressure for a fixed time period ("retention time") facilitating the conversion of organic matter into bio-oil. The temperature and/or pressure required to drive conversion of organic material into biofuel using the methods of the invention will depend on a number of factors including the type of organic matter under treatment and the relative proportions of components in the reaction mixture under treatment (e.g. the proportion of water, oil, organic matter and any other additional component/s such as, for example, catalyst/s and/or alcohol/s). It will be recognised that various catalysts as described herein (see sub-section above entitled "Catalysts") may be used to increase the efficiency of reactions which may in turn reduce the temperature and/or pressure required to drive conversion of the organic matter to biofuel using a given oil-based solvent. Based on the description of the invention provided herein the skilled addressee could readily determine appropriate reaction temperature and pressure for a given reaction mixture. For example, the optimal reaction temperature and/or pressure for a given feedstock slurry may be readily determined by the skilled addressee by preparing and running a series of reactions that differ only by temperature and/or pressure utilised and analysing the yield and/or quality of biofuel produced.

The skilled addressee will also recognise that the pressure utilised is a function of the slurry components and pressure drop, induced by the slurry, and strongly dependent on any particular reactor design (e.g. pipe diameter and/or length etc).

In certain embodiments, treatment of organic matter to produce biofuel using the methods of the invention may be conducted at temperature(s) of between about 150° C. and about 550° C. and pressure(s) of between about 10 bar and about 400 bar. Preferably, the reaction mixture is maintained at temperature(s) of between about 150° C. and about 500° C. and pressure(s) of between about 80 bar and about 350 bar. More preferably the reaction mixture is maintained at temperature(s) of between about 180° C. and about 400° C. and pressure(s) of between about 100 bar and about 330 bar. Still more preferably the reaction mixture is maintained at temperature(s) of between about 200° C. and about 380° C. and pressure(s) of between about 120 bar and about 250 bar.

In particularly preferred embodiments, the reaction mixture is maintained at temperature(s) of between about 200° C. and about 400° C., and pressure(s) of between about 100 bar and about 300 bar.

In other particularly preferred embodiments, the reaction mixture is maintained at temperature(s) of between about 250° C. and about 380° C., and pressure(s) of between about 50 bar and about 300 bar.

In other particularly preferred embodiments, the reaction mixture is maintained at temperature(s) of between about 320° C. and about 360° C. and pressure(s) of between about 150 bar and about 250 bar. In other particularly preferred embodiments, the reaction mixture is maintained at temperature(s) of between about 330° C. and about 350° C. and pressure(s) of between about 230 bar and about 250 bar. In another particularly preferred embodiment, the reaction mixture is maintained at temperature(s) of about 340° C. and pressure(s) of between about 240 bar.

In certain embodiments, the reaction mixture is maintained at temperature(s) of above about 180° C. and pressure(s) above about 150 bar. In other embodiments, the reaction mixture is maintained at temperature(s) of above about 200° C. and pressure(s) above about 180 bar. In additional embodiments, reaction mixture is maintained at temperature(s) of above about 250° C. and pressure(s) above about 200 bar. In other embodiments, the treatment is performed at temperature(s) of above about 300° C. and pressure(s) above about 250 bar. In other embodiments, reaction mixture is maintained at temperature(s) of above about 350° C. and pressure(s) above about 300 bar.

It will be understood that in certain embodiments an oil-based solvent used in the methods of the invention may be heated and pressurised beyond its critical temperature and/or beyond its critical pressure (i.e. beyond the 'critical point' of the solvent). Accordingly, the solvent may be a 'supercritical' solvent if heated and pressurised beyond the 'critical point' of the solvent.

In certain embodiments an oil-based solvent used in the methods of the invention may be heated and pressurised to level(s) below its critical temperature and pressure (i.e. below the 'critical point' of the solvent). Accordingly, the solvent may be a 'subcritical' solvent if its maximum temperature and/or maximum pressure is below that of its 'critical point'. Preferably, the 'subcritical' solvent is heated and/or pressurised to level(s) approaching the 'critical point' of the solvent (e.g. between about 10° C. to about 50° C. below the critical temperature and/or between about 10 atmospheres to about 50 atmospheres below its critical pressure).

In some embodiments, an oil-based solvent used in the methods of the invention may be heated and pressurised to levels both above and below its critical temperature and pressure (i.e. heated and/or pressurised both above and below the 'critical point' of the solvent at different times). Accordingly, the solvent may oscillate between 'subcritical' and 'supercritical' states when performing the methods.

Retention Time

The specific time period over which the conversion of organic matter may be achieved upon reaching a target temperature and pressure (i.e. the "retention time") may depend on a number different factors including, for example, the type of oil-based solvent used, the percentage of alcohol (if present) in the solvent, the type of organic matter under treatment, the physical form of the organic matter under treatment, the types of catalyst(s) (if present) in the mixture and their various concentration(s), and/or the type of apparatus in which the methods are performed. These and other factors may be varied in order to optimise a given method so as to maximise the yield and/or reduce the processing time. Preferably, the retention time is sufficient to convert all or substantially all of the organic material used as a feedstock into biofuel.

In certain embodiments, the retention time is less than about 60 minutes, 45 minutes, 30 minutes, 25 minutes, 20 minutes, 15 minutes, 10 minutes or less than about 5 minutes. In certain embodiments, the retention time is more than about 60 minutes, 45 minutes, 30 minutes, 25 minutes, 20 minutes, 15 minutes, 10 minutes or more than about 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

Persons skilled in the art will recognised that various catalysts as described herein (see sub-section below entitled "Catalysts") may be used to increase the efficiency of the treatment which may in turn reduce the retention time required to convert the organic matter into biofuel. Similarly, the retention time required will be influenced by the proportions of various components in the reaction mixture (e.g. water, oil, alcohol catalysts etc).

The optimal retention time for a given set of reaction conditions as described herein may be readily determined by the skilled addressee by preparing and running a series of reactions that differ only by the retention time, and analysing the yield and/or quality of biofuel produced.

Heating/Cooling, Pressurisation/De-Pressurisation

A reaction mixture (e.g. in the form of a slurry) comprising organic matter, oil-based solvent and optionally one or more catalysts as defined herein may be brought to a target temperature and pressure (i.e. the temperature/pressure maintained for the "retention time") over a given time period.

Reaction mixes that do not contain a significant proportion of oil may require a very fast initial conversion to generate some solvent in-situ. However, the incorporation of oil into the reaction mixture as described herein allows the oil to act as a solvent thus alleviating the requirement for rapid heating/pressurisation.

In continuous flow systems, pressure will generally change from atmospheric to target pressure during the time it takes to cross the pump (i.e. close to instantaneous) whereas in a batch system it will mirror the time that it takes to heat the mixture up.

In some embodiments, the reaction mixture may be brought to a target temperature and/or pressure in a time period of between about 30 seconds and about 30 minutes.

In some embodiments, the reaction mixture may be brought to a target temperature and/or pressure in a time period less than about 15 minutes, less than about 10 minutes, less than about 5 minutes, or less than about 2 minutes.

In certain embodiments, the reaction mixture may be brought to a target pressure substantially instantaneously and brought to a target temperature in less than about 20 minutes, less than about 10 minutes, or less than about 5 minutes. In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes.

Additionally or alternatively, following completion of the retention time period the reaction mixture may be cooled to between about 150° C. and about 200° C., between about 160° C. and about 200° C., preferably between about 170° C. and about 190° C., and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of heating/pressurisation and cooling/de-pressurisation may be facilitated by performing the methods of the invention in a continuous flow system (see section below entitled "Continuous flow").

Continuous Flow

Biofuel production from organic matter using the methods of the invention may be assisted by performing the methods under conditions of continuous flow.

Although the methods of the invention need not be performed under conditions of continuous flow, doing so may provide a number of advantageous effects. For example, continuous flow may facilitate the accelerated implementation and/or removal of heat and/or pressure applied to the slurry. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the slurry heats/pressurises and/or cools/de-pressurises. Continuous flow is also believed to enhance reactions responsible for conversion of organic matter to biofuel by virtue of generating mixing and shear forces believed to aid in emulsification which may be an important mechanism involved in the transport and "storage" of the oils generated away from the reactive surfaces of the feedstock as well as providing interface surface area for so-called 'on-water catalysis'.

Accordingly, in preferred embodiments the methods of the invention are performed under conditions of continuous flow. As used herein, the term "continuous flow" refers to a process wherein organic matter mixed with an oil-based solvent in the form of a slurry (with or without additional catalysts) is subjected to:

(a) heating and pressurisation to a target temperature and pressure,
(b) treatment at target temperature(s) and pressure(s) for a defined time period (i.e. the "retention time"), and
(c) cooling and de-pressurisation, while the slurry is maintained in a stream of continuous movement along the length (or partial length) of a given surface. It will be understood that "continuous flow" conditions as contemplated herein are defined by a starting point of heating and pressurisation (i.e. (a) above) and by an end point of cooling and de-pressurisation (i.e. (c) above).

Continuous flow conditions as contemplated herein imply no particular limitation regarding flow velocity of the slurry provided that it is maintained in a stream of continuous movement.

Preferably, the minimum (volume-independent) flow velocity of the slurry along a given surface exceeds the settling velocity of solid matter within the slurry (i.e. the terminal velocity at which a suspended particle having a density greater than the surrounding solution moves (by gravity) towards the bottom of the stream of slurry).

For example, the minimum flow velocity of the slurry may be above about 0.01 cm/s, above about 0.05 cm/s, preferably above about 0.5 cm/s and more preferably above about 1.5 cm/s. The upper flow velocity may be influenced by factors such as the volumetric flow rate and/or retention time. This in turn may be influenced by the components of a particular reactor apparatus utilised to maintain conditions of continuous flow.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of slurry is maintained.

The use of a suitable flow velocity (under conditions of continuous flow) may be advantageous in preventing scale-formation along the length of a particular surface that the slurry moves along (e.g. vessel walls of a reactor apparatus) and/or generating an effective mixing regime for efficient heat transfer into and within the slurry.

Biofuel Products

The methods of the invention may be used to produce biofuel from organic matter. The nature of the biofuel product may depend on a variety of different factors including, for example, the organic material feedstock, and/or the reaction conditions/reagents utilised in the methods.

In certain embodiments, the biofuel product may comprise one or more of bio-oil, oil char (e.g. carbon char with bound oils), soluble light oil, gaseous product (e.g. methane, hydrogen, carbon monoxide and/or carbon dioxide), alcohol (e.g. ethanol, methanol and the like), and biodiesel.

In certain embodiments, a biofuel may be produced from fossilised organic matter such as, for example, lignite (brown coal), peat or oil shale. The biofuel may comprise solid, liquid and gas phases. The solid phase may comprise a high carbon char (upgraded PCI equivalent coal). The liquid phase may comprise bio-oils. The gaseous product may comprise methane, hydrogen, carbon monoxide and/or carbon dioxide.

In other embodiments, a biofuel may be produced from organic matter comprising lignocellulosic matter. The biofuel may comprise a liquid phase comprising bio-oil.

Biofuels (e.g. bio-oils) produced in accordance with the methods of the invention may comprise a number of advantageous features, non-limiting examples of which include reduced oxygen content, increased hydrogen content, increased energy content and increased stability. In addition, bio-oils produced by the methods of the invention may comprise a single oil phase containing the liquefaction product. The product may be separated from the oil phase using, for example, centrifugation eliminating the need to evaporate large amounts of water.

A bio-oil product (also referred to herein as an "oil" product) produced in accordance with the methods of the invention may comprise an energy content of greater than about 25 MJ/kg, greater than about 30 MJ/kg, more preferably greater than about 32 MJ/kg, more preferably greater than about 35 MJ/kg, still more preferably greater than about 37 MJ/kg, 38 MJ/kg or 39 MJ/kg, and most preferably above about 41 MJ/kg. The bio-oil product may comprise less than about 15% wt db oxygen, preferably less than about 10% wt db oxygen, more preferably less than about 8% wt db oxygen and still more preferably less than about 7% wt db oxygen, and preferably less than about 5% wt db oxygen. The bio-oil product may comprise greater than about 6% wt db hydrogen, preferably greater than about 7% wt db hydrogen, more preferably greater than about 8% wt db hydrogen, and still more preferably greater than about 9% wt db hydrogen. The molar hydrogen:carbon ratio of a bio-oil of the invention may be less than about 1.5, less than about 1.4, less than about 1.3, or less than about 1.2.

A bio-oil produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, plant sterols, modified plant sterols, asphaltenes, pre-asphaltenes, and waxes.

A char or oil char product produced in accordance with the methods of the invention may comprise an energy content of greater than about 20 MJ/kg, preferably greater than about 25 MJ/kg, more preferably greater than about 30 MJ/kg, and still more preferably greater than about 31 MJ/kg, 32 MJ/kg, 33 MJ/kg or 34 MJ/kg. The char or oil char product may comprise less than about 20% wt db oxygen, preferably less than about 15% wt db oxygen, more preferably less than about 10% wt db oxygen and still more preferably less than about 9% wt db oxygen. The char or oil char product may comprise greater than about 2% wt db hydrogen, preferably greater than about 3% wt db hydrogen, more preferably greater than about 4% wt db hydrogen, and still more preferably greater than about 5% wt db hydrogen. The molar hydrogen:carbon ratio of a char or oil char product of the invention may be less than about 1.0, less than about 0.9, less than about 0.8, less than about 0.7, or less than about 0.6.

An oil char product produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, asphaltenes, pre-asphaltenes, and waxes.

A char product (upgraded PCI equivalent coal) produced in accordance with the methods of the invention may comprise, for example, a mixture of amorphous and graphitic carbon with end groups partially oxygenated, giving rise to surface carboxy- and alkoxy groups as well as carbonyl and esters.

Biofuels produced in accordance with the methods of the invention may be cleaned and/or separated into individual components using standard techniques known in the art.

For example, solid and liquid phases of biofuel product (e.g. from the conversion of coal) may be filtered through a pressure filter press, or rotary vacuum drum filter in a first stage of solid and liquid separation. The solid product obtained may include a high carbon char with bound oils. In certain embodiments, the oil may be separated from the char, for example, by thermal distillation or by solvent extraction. The liquid product obtained may contain a low percentage of light oils, which may be concentrated and recovered though an evaporator.

Biofuel produced in accordance with the methods of the invention may be used in any number of applications. For example, the biofuels may be blended with other fuels, including for example, ethanol, diesel and the like. Additionally or alternatively, the biofuels may be upgraded into higher fuel products. Additionally or alternatively, the biofuels may be used directly, for example, as petroleum products and the like.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting Example 1

Exemplary Conversion of Organic Matter to a Synthetic Crude Oil and/or Lignite to a Synthetic Crude Oil and Upgraded Coal Product (i) Slurry Preparation Pre-ground feedstock (biomass containing 20 wt % water, lignite containing 45-50 wt % water) was slurried with paraffinic oil in an agitated slurrying tank with a feedstock to paraffinic oil ratio of 0.5-1.2:1.

In the present case the paraffinic oil was only used at start-up and was progressively substituted by the synthetic crude oils produced from the system described below.

In the case of lignocellulosic biomass, when water alone was used as the mobile phase preferred pumpable slurry concentrations were around 20% solids, dry basis (due to swelling of the biomass in the water). Substituting oil for at least a portion of the water in the mobile phase was used to increase the pumpable slurry concentration up to approximately 40% solids (dry basis). This approximately halved both the reactor size and the heat required to achieve desired reaction temperatures due to the approximately 50% lower heat capacity of the oil.

In the case of Lignite when water was used as the mobile phase the water slurry concentration on a dry basis was in the order of 30%. Substituting oil for at least a portion of the water in the mobile phase allowed some increase in the pumpable slurry concentration and benefited the overall heat balance (as per above).

(ii) Heating and Pressurisation

A high-pressure pump was fed by the slurrying tank to deliver the slurry to heating section at pressures ranges as shown in Table 3 below. Heating of the slurry can be performed in several ways, for example, by a counter or co-current heat exchange system and/or by immersion of the heating section in a hot fluidized bed. Alternatively, the slurry can be heated in a ballistic fashion by the intersection of the slurry in the heating section with an oil or water stream heated, for example, in the range of 400-720 degrees Celsius (see, for example, PCT application number PCT/AU2011/000802 entitled "Ballistic heating process", the entire contents of which are incorporated herein by reference). In all cases, the target slurry temperature was in the range of 250-350 degrees Celsius (centigrade) upon entering the reactor. In certain cases, one or more catalysts incorporated into the slurry prior to entry into the reactor.

(iii) Conversion Reaction

The slurry was fed into the reactor (which can either have a vertical or horizontal orientation) under conditions of continuous flow with the oil/biomass and/or oil/lignite slurry being kept at a constant temperature and pressure inside the ranges as shown in Table 3 below.

The residence time at the reaction temperature was held to the range of 10-25 min. dependent on feedstock and catalysts applied. As the reaction is mildly endothermic (3-5 MJ/kg of product) only a small amount of trim heating was necessary.

This experimental observation means that little restriction exists to the diameter of the reactor tube as it does not need to be heated substantially; the thermal mass and lagging the reactor sufficed. Another major positive factor related to scaling the system and keeping the reactor length to a minimum.

340 degrees Celsius, a residence time of 15 minutes and a pressure of 240 bar in an oil/biomass slurry.

Partially oxygenated bio-oil is not very soluble in the paraffinic oil as they are chemically dissimilar in nature. In contrast the bio-oil produced under the aforementioned reaction conditions is miscible in the paraffinic oil is therefore chemically a much more similar product (i.e. less oxygenated and less polar).

It was also experimentally observed that in the oil biomass slurry, keeping all things equal—but lowering the temperature by 30 degrees Celsius, two oil phases were observed. In addition, when the temperature was increased by 30 degrees Celsius two oil layers were also observed with solids present that were subsequently identified to be very high melting polymeric biomass oils.

For these reasons it is apparent that at around 340 degrees centigrade and a 15 minute residence time near optimum conditions are reached for the production of low oxygen bio-oil. The pressure used is a function of the slurry components and pressure drop, induced by the slurry, strongly dependent on any particular reactor design. In the current example a pressure of 240 bar was found to be optimal. However, the reaction it self is not very pressure sensitive as long as water is predominantly present in its liquid form.

Furthermore, as these bio-oils are very soluble in the oil phase, chemical equilibria are being altered as compared to the case when using water as a processing liquid. It is

TABLE 3

Non-limiting example of process variables

| Feedstock Type | Ranges of solids (db) in slurry (% wt) | Ranges of oil in slurry (% wt) | Temp ranges (° C.) | Pressure ranges (bar) | Retention time ranges (min) | Additives Conc. Ranges in Reaction Mixture |
|---|---|---|---|---|---|---|
| Lignite | 20-35 | 20-60 | 200-380 | 100-350 | 10-25 | 0.1-0.5M sodium hydroxide |
| Radiata Pine, bana grass | 20-40 | 20-60 | 200-380 | 100-350 | 5-25 | 0.1-0.5M sodium hydroxide |

(iv) Cooling and Pressure Let-Down

At the end of the set residence time the product stream first passed through a heat exchanger with an exit temperature in the range of 50-180 degrees Celsius (at which stage reaction rates slow substantially), this final set temperature being feedstock dependent. This was followed by a subsequent stage of pressure let down to atmospheric pressure. The pressure let-down system was used to generate the back-pressure in the reactor and heating system allowing a continuous flow reaction to be achieved at a constant pressure and temperature steady state. A suitable pressure let down system is described, for example, in International (PCT) Patent Application No. PCT/AU2010/001175 entitled "An assembly for reducing slurry pressure in a slurry processing system", the entire contents of which are incorporated herein by reference.

(v) Results

It was observed that substitution of water with paraffinic heavy oil provided a final oil phase that has only a single phase rather than the anticipated/usual two layers of oil (one being a partially oxygenated (approx 10-12% by weight oxygen) bio-oil and the other being the immiscible paraffinic oil). This was observed to occur at a reaction temperature of anticipated that this will lead to a fuller and improved conversion of lignite to oil as well.

When water was used as the mobile phase the energy needed to heat the water up to a reaction temperature in the heating system caused charring on the inside of the heated tube wall when both lignocellulosic biomass and lignite were processed using conventional (rather than ballistic) heating. Charring on the inside of the heated tube wall was not observed when the oil is used as the mobile phase. Until now the only way to avoid this charring when biomass was processed with water as the mobile phase was to add a co-solvent such as ethanol (very expensive) or use ballistic heating. The ballistic heating needs two streams to converge rapidly in a ballistic heating chamber; one stream being the unheated slurry stream of biomass and water and the second stream being a supercritically heated water phase such that the final temperature of the combined streams were at reaction temperature as they entered the reactor. The cost of the supercritical boiler needed with its inherent water deionisation stage had a major negative impact on the plant capex which is overcome by the current approach.

Example 2

Conversion of Lignite to Synthetic Crude Oil and Calorific Char

This example demonstrates the conversion of organic matter, in this case lignite, to a synthetic crude oil and a calorific char. In this example an aqueous alcohol (ethanol) was included in the reaction. The reaction was carried out in a single pass through the reactor, the emphasis being on the use of a mineral oil as slurrying agent to promote the formation of oil-soluble compounds in the reaction. This is accomplished by driving chemical equilibria in the direction of oil soluble products by capturing them from the aqueous phase into the oil phase. The alcohol is present to assist in the formation of e.g. esters and ethers that are oil soluble. The reaction also exemplifies the heat transfer benefits of using a slurrying medium with a substantial oil component and a reduced water component.

Pre-milled lignite-water slurry (70% water) was further slurried with ethanol and white mineral oil in the ratios lignite/water slurry:ethanol:mineral oil 5:1:4 by mass. Additional catalyst was sodium hydroxide at a concentration of 0.1 Molar based on the total amount of water present. Reaction conditions were 240 bar pressure, 340° C. and 25 minutes residence time. Heating of the slurry to reaction temperature was accomplished by mixing with supercritical steam in 'ballistic heating' as described above and in, for example, PCT application number PCT/AU2011/000802 entitled "Ballistic heating process" (the entire contents of which are incorporated herein by reference). The following intrinsic catalysts were also present by virtue of contact between the slurry and the metal reactor wall: metallic iron, chromium, nickel, molybdenum, managanese, and the oxides, hydroxides, acetates, carbonates and hydrogen carbonates of these metals.

The products of the reaction after pressure let down and cooling to ambient temperature and pressure were an oil phase containing both the original mineral oil and new lignite-derived oil (synthetic crude oil), an aqueous phase containing dissolved organic compounds, and a solid phase consisting of a calorific char. A gaseous phase (producer gas) was also collected at the pressure let-down step. Persons skilled in the art will recognize that upon repeated separation and cycling of a part of the oil phase (mineral oil+synthetic crude oil) with new feedstock, the mineral oil phase would eventually be almost completely replaced by synthetic crude oil, derived from lignite.

Example 3

Conversion of Radiata Pine Wood Flour to Synthetic Crude Oil

This example demonstrates the conversion of organic matter, in this case radiata pine, to a synthetic crude oil. The reaction was carried out in a single pass through the reactor, the emphasis being on the use of a mineral oil as slurrying agent to promote the formation of oil-soluble compounds in the reaction. This was accomplished by driving chemical equilibria in the direction of oil soluble products by capturing them from the aqueous phase into the oil phase. The reaction also exemplifies the heat transfer benefits of using a slurrying medium with a substantial oil component and a reduced water component.

Radiata pine wood flour containing water was slurried with white mineral oil in the ratios wood:water:mineral oil 2:17:17 by mass, where the wood mass is on an oven dry basis. Additional catalyst was sodium hydroxide at a concentration of 0.1 Molar based on the total amount of water present. Reaction conditions were 240 bar pressure, 340° C. and 25 minutes residence time. Heating of the slurry to reaction temperature was accomplished by mixing with supercritical steam in 'ballistic heating' as described above and in, for example, PCT application number PCT/AU2011/000802 entitled "Ballistic heating process" (the entire contents of which are incorporated herein by reference). The following intrinsic catalysts were also present by virtue of contact between the slurry and the metal reactor wall: metallic iron, chromium, nickel, molybdenum, managanese, and the oxides, hydroxides, acetates, carbonates and hydrogen carbonates of these metals.

The products of the reaction after pressure let down and cooling to ambient temperature and pressure were an oil phase, less dense than the aqueous phase, containing both the original mineral oil and new wood-derived oil (synthetic crude oil I), a second, more dense oil phase containing more polar wood-derived oil (synthetic crude oil II), and an aqueous phase containing dissolved organic compounds. A gaseous phase (producer gas) was also collected at the pressure let-down step. Persons skilled in the art will recognize that upon repeated separation and cycling of a part of the lighter oil phase (mineral oil+synthetic crude oil I) with new feedstock, the mineral oil phase would eventually be almost completely replaced by synthetic crude oil I, derived from wood.

The invention claimed is:

1. A method for producing bio-oil from an organic matter feedstock, the method comprising:
   producing a slurry comprising between about 20% and about 40% by weight of organic matter feedstock, water and between about 20% and about 60% by weight of oil;
   treating the slurry in a reactor apparatus at a temperature of between about 200° C. and about 450° C. and a pressure of between about 100 bar and about 350 bar; and
   cooling the slurry and releasing said pressure thereby providing the bio-oil, and
   using a recycled portion of the bio-oil to treat additional organic matter feedstock by the method, in which an additional slurry comprising between about 20% and about 40% by weight of the additional organic matter feedstock, water, and between about 20% and about 60% by weight of the recycled portion of the bio-oil is treated in a reactor apparatus at a temperature of between about 200° C. and about 450° C. and a pressure of between about 100 bar and about 350 bar, then cooled and depressurised to thereby provide additional bio-oil.

2. The method of claim 1, wherein the slurry further comprises an aqueous alcohol.

3. The method of claim 2, wherein the aqueous alcohol is ethanol or methanol.

4. The method of claim 2, wherein the slurry comprises a percentage by weight of said alcohol of: between about 5 wt % and about 40 wt %.

5. The method of claim 1, wherein the organic matter feedstock is lignite.

6. The method of claim 1, wherein said treating comprises contacting the slurry with subcritical or supercritical steam in a chamber of said reactor apparatus, and wherein said slurry is at ambient or near ambient temperature and pressure prior to said contacting with the subcritical or supercritical steam.

7. The method of claim 1 comprising treating organic matter with an oil-based solvent comprising less than about 50 wt % water at a temperature of between about 200° C. and about 400° C., and a pressure of between about 100 bar and about 300 bar.

8. The method according to claim 7, wherein said organic matter is fossilised organic matter having a carbon content of at least 50%, and said solvent is an oil comprising less than 50 wt % water.

9. The method according to claim 1, wherein said treating comprises use of at least one additional catalyst selected from the group consisting of: an additional base catalyst; an additional catalyst that enhances incorporation of hydrogen into said organic matter; an additional catalyst that enhances removal of oxygen from said organic matter.

10. The method according to claim 9, wherein said additional base catalyst is an alkali metal hydroxide catalyst, a transition metal hydroxide catalyst, sodium hydroxide or potassium hydroxide.

11. The method according to claim 9, wherein said catalyst that enhances incorporation of hydrogen is selected from the group consisting of alkali metal formate catalysts, transition metal formate catalysts, reactive carboxylic acid catalysts, transition metal catalysts including their hydrides, sulphide catalysts, noble metal catalysts including their hydrides, water-gas-shift catalysts, a low-valent iron species, an iron hydride, a zero-valent iron homogeneous species, a zero-valent iron heterogeneous species, sodium formate, and combinations thereof.

12. The method according to claim 9, wherein said catalyst that enhances removal of oxygen from said organic matter is selected from the group consisting of alkali metal formate catalysts, transition metal formate catalysts, reactive carboxylic acid catalysts, transition metal catalysts, including their hydrides, sulphide catalysts, noble metal catalysts, including their hydrides, water-gas-shift catalysts, and combinations thereof.

13. The method according to claim 1, wherein said treating is performed under conditions of continuous flow.

14. The method according to claim 1, wherein:
(i) said temperature is between about 250° C. and about 350° C., and said pressure is between about 100 bar and about 300 bar; or
(ii) said temperature is between about 320° C. and about 360° C., and said pressure is between about 150 bar and about 250 bar.

15. The method according to claim 1, wherein said treating is for a time period of at least about 5 minutes, between about 5 minutes and about 25 minutes, or about 15 minutes.

16. The method according to claim 1, wherein said organic matter is in the form of a slurry comprising:
(i) at least 30 wt % of said organic matter; and/or
(ii) a feedstock to oil ratio of 0.5-1.2:1.

17. The method of claim 1, wherein the oil is selected from the group consisting of paraffinic oil, gas-oil, crude oil, synthetic oil, coal-oil, bio-oil, shale oil, kerogen oil, mineral oil, white mineral oil, and aromatic oil.

18. The method of claim 1, wherein the organic matter feedstock is lignocellulosic matter.

* * * * *